United States Patent [19]

Ward et al.

[11] 4,227,954
[45] Oct. 14, 1980

[54] METHOD FOR SEALING CONTAINER CAP PARTS

[75] Inventors: Gary A. Ward, Round Lake, Ill.; David A. Winchell, Twin Lakes, Wis.

[73] Assignee: Baxter Travenol Laboratories, Inc., Deerfield, Ill.

[21] Appl. No.: 956,559

[22] Filed: Nov. 1, 1978

Related U.S. Application Data

[62] Division of Ser. No. 885,480, Mar. 13, 1978, Pat. No. 4,153,173.

[51] Int. Cl.² .................... B29D 9/00; B29C 17/00
[52] U.S. Cl. ............................ 156/250; 156/292; 156/309.6; 264/138; 264/248
[58] Field of Search ............... 156/69, 261, 262, 242, 156/245, 306; 264/248, 138; 220/352, 356, 306; 53/329

[56] References Cited

U.S. PATENT DOCUMENTS

| | | | |
|---|---|---|---|
| 1,921,808 | 8/1933 | Cohn | 156/262 |
| 2,413,449 | 12/1946 | Hatch | 156/69 |
| 2,684,674 | 7/1954 | Archer | 215/247 |
| 3,033,202 | 5/1962 | Richter et al. | 141/329 |
| 3,047,178 | 7/1962 | Poitras et al. | 215/249 |
| 3,055,367 | 9/1962 | Thorstad | 141/329 |
| 3,355,340 | 11/1967 | Calvert et al. | 156/69 |
| 3,375,858 | 4/1968 | Jellies | 141/329 |
| 3,394,831 | 7/1968 | Balthish et al. | 215/249 |
| 3,970,490 | 7/1976 | Raines et al. | 156/261 |
| 3,994,412 | 11/1976 | Difiglio | 215/249 |
| 4,111,324 | 9/1978 | Winchell | 215/249 |

Primary Examiner—Donald E. Czaja
Attorney, Agent, or Firm—Paul C. Flattery; John P. Kirby, Jr.; Gary W. McFarron

[57] ABSTRACT

A cap closure is provided for bonding to the neck of a container. The cap closure includes a base portion enclosed by a side wall, a peripheral rim extending outwardly from the side wall with the rim being adapted for bonding to the neck of the container, an administration port connected to the base portion, a medication addition port connected to the base portion, a resealable injection site connected to the medication addition port, and port protectors covering and hermetically sealing the administration and medication addition ports. In the illustrative embodiment, the base portion, side wall, peripheral rim, administration port and medication addition ports are molded as an integral, unitary member, and a method is provided for fusing a membrane to the medication addition port and for fusing port protectors with the base member.

1 Claim, 3 Drawing Figures

METHOD FOR SEALING CONTAINER CAP PARTS

This is a division of application Ser. No. 885,480, filed Mar. 13, 1978, now U.S. Pat. No. 4,153,173.

BACKGROUND OF THE INVENTION

The present invention concerns a novel cap closure for bonding to the neck of a container, and a method for producing a cap closure.

Sterile pharmaceutical solutions, such as 5% dextrose, normal saline and the like, are supplied to hospitals for infusion into a patient's veins from a container hanging above the patient. The sterile liquid flows by gravity through a tubular administration set connected at one end to the container and at an opposite end to a venous needle in the patient.

Such containers are frequently formed of thermoplastic material, and will include a neck portion having an opening extending through the neck portion. As used in the specification and claims herein, the term "neck portion" includes the generally vertically oriented neck of the container and any generally horizontally oriented platform or base extending from the neck or depending from the neck.

The aforesaid container will generally include a closure or stopper which carries or defines one or more ports, with the ports being hermetically sealed to provide sterile sealed contents to the container. An example of such a container is disclosed in McPhee U.S. Pat. No. 3,900,028. It is desirable that the port be in a sterile environment. In copending United States application Ser. No. 777,748, filed Mar. 14, 1977, in the name of David A. Winchell, entitled "Hermetically Sealed Tamperproof Port Protector", and assigned to the assignee of the present invention, a thermoplastic port protector is disclosed which covers the port and defines a frangible section. The closure has a length to diameter ratio providing good mechanical advantage leverage to rupture the frangible section when the closure is pushed sideways.

It is an object of the present invention to provide a cap closure for bonding to the neck of a container, which cap closure receives port protector means with a hermetic seal.

Another object of the present invention is to provide a cap closure for bonding to the neck of a container, which cap closure carries an administration port and a medication addition port, and is simple and efficient to manufacture.

A further object of the present invention is to provide a cap closure for pharmaceutical containers, such as an IV container or a blood container, which can be bonded to the neck of the container and can be easily sterilized.

Another object of the present invention is to provide a cap closure for bonding to the neck of a pharmaceutical container, which cap closure carries an administration port and a medication addition port, and which cap closure allows port protectors to be bonded thereto with a hermetic seal.

A further object of the present invention is to provide an efficient method for producing a cap closure for bonding to the neck of a pharmaceutical container.

Other objects and advantages of the present invention will become apparent as the description proceeds.

SUMMARY OF THE INVENTION

One illustrative embodiment of the present invention is illustrated in FIGS. 6-10 of U.S. patent application Ser. No. 777,748, filed Mar. 14, 1977, and assigned to the assignee of the present invention. In accordance with the present invention, a cap closure for bonding to the neck of a container is provided. The cap closure includes a base portion enclosed by a side wall, and a peripheral rim extending outwardly from and connected to the side wall, with the rim being adapted for bonding to the neck of the container. An administration port and a medication addition port are connected to the base portion, and a resealable injection site is connected to the medication addition port. Port protector means cover and hermetically seal the administration and medication addition ports.

In the illustrative embodiment, rib means are carried by the cap and extend from the bottom of the base portion. The rib means operate to prevent the cap from deforming during sterilization.

In the illustrative embodiment, the base portion, side wall, peripheral rim, administration port, medication addition port and rib means are all molded as an integral, unitary member.

In the illustrative embodiment, the port protector means comprise a protector cap that is hermetically bonded to the base portion. The base portion includes a raised island portion surrounding the administration and medication addition ports, to receive the protector cap and to provide a relief area for molten material to flow when the protector cap is being bonded to the base portion.

In the method of producing a cap closure for a container in accordance with the present invention, a unitary member is molded, which unitary member includes a base portion, an administration port on the base portion, and a medication addition port on the base portion. Membrane material is positioned over the medication addition port and a membrane is punched out of the membrane material by a heated die having a larger area dimension than the medication addition port area dimension. The punched-out membrane is pressed to the top of the medication addition port by the heated die, so that the membrane and port portion adjacent thereto become molten and are fused together.

In the llustrative embodiment, a raised island portion is provided surrounding the ports. A port protector is positioned on the raised island portion over each of the ports and a heated die is brought into thermal contact with the port protector and the island to fuse the port protector with the island, and thereby hermetically seal the ports.

A more detailed explanation of the invention is provided in the following description and claims, and is illustrated in the accompanying drawings.

DETAILED DESCRIPTION OF THE ILLUSTRATIVE EMBODIMENT

Figure 1:
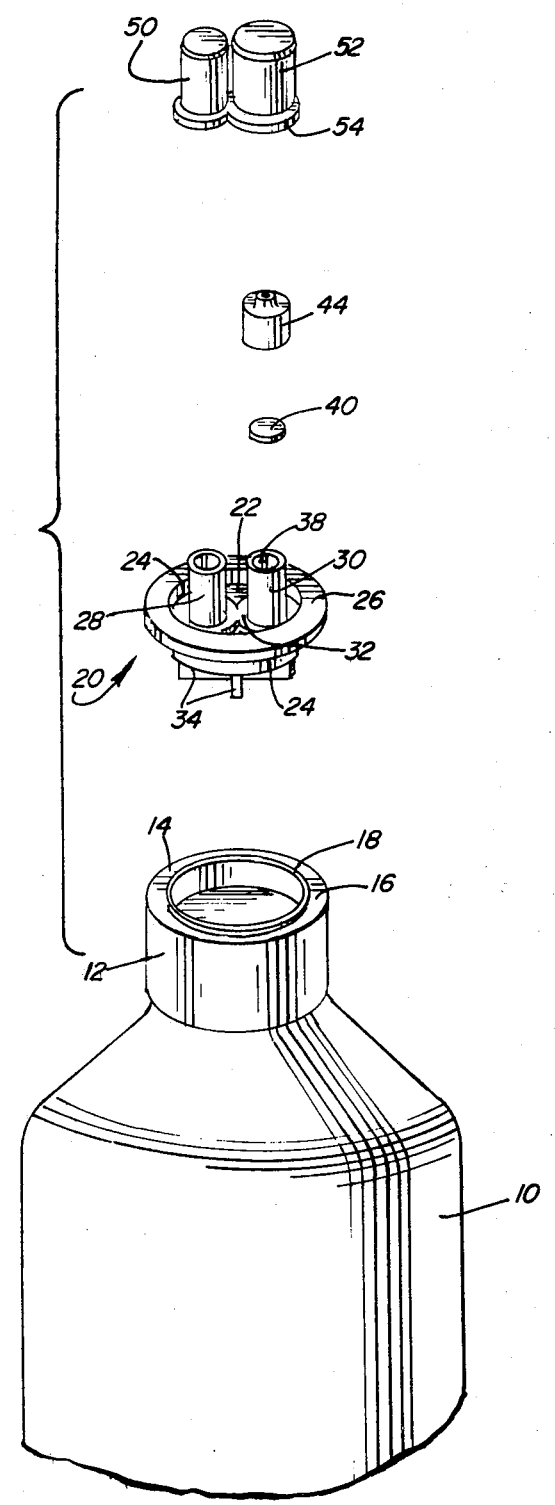
FIG. 1 is an exploded perspective view of a cap closure constructed in accordance with the principles of the present invention.

Referring to the drawings, there is fragmentarily illustrated a thermoplastic container 10 having an integral neck portion 12. The neck portion 12 is formed integrally with the body of the container 10 in a conventional manner. The top 14 of the neck portion 12 comprises a sealing surface for a cap closure and includes a horizontal outer portion 16 and a raised inner ring 18. The sealing of the cap closure to top surface 14 of neck 12 will be described in more detail below.

Cap closure 20 comprises a unitary integral molded member, preferably formed of polyolefin material. The cap closure 20 includes a base portion 22 enclosed by a circular side wall 24, with an annular peripheral rim 26 extending outwardly from the top of the side wall 24. Base portion 22 carries an administration port member 28 and a medication addition port member 30. A raised island, preferably 0.015 inch higher than the plane of the remainder of base portion 22, surrounds ports 28 and 30 and has a generally figure-eight shape. The raised island 32 around the ports provides a relief area for molten material to flow under the port protector heat sealing die as described below.

Figure 3:
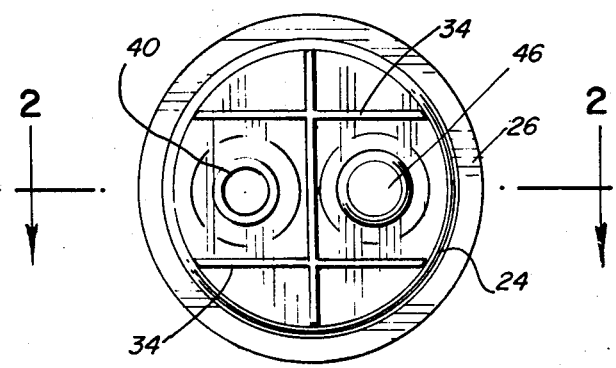
FIG. 3 is a bottom view of the closure cap of FIG. 2.

In order to prevent the closure cap 20 from deforming during sterilization, as well as preventing deformation during the heat welding stages of the cap closure assembly, a number of ribs 34 are provided across the bottom of the cap. The preferred configuration of ribs 34 is illustrated in FIG. 3.

Medication addition port member 30 defines a bore 38 which is sealed by means of a membrane 40. Membrane 40 is preferably formed from an extruded strip of polyolefin material having a thickness of 0.005 inch. The strip of membrane material is positioned over the top of the medication addition port member 30 and is punched-out of the strip by a heated die having a slightly larger diameter than the diameter of the port 30. The heated die presses the membrane material to the top of port 30 so that the membrane and the top of port 30 become molten and are fused together. As shown most clearly in FIG. 2, a circumferential lip 42 is formed at the top of port 30 which aids in retaining injection site 44.

Figure 2:
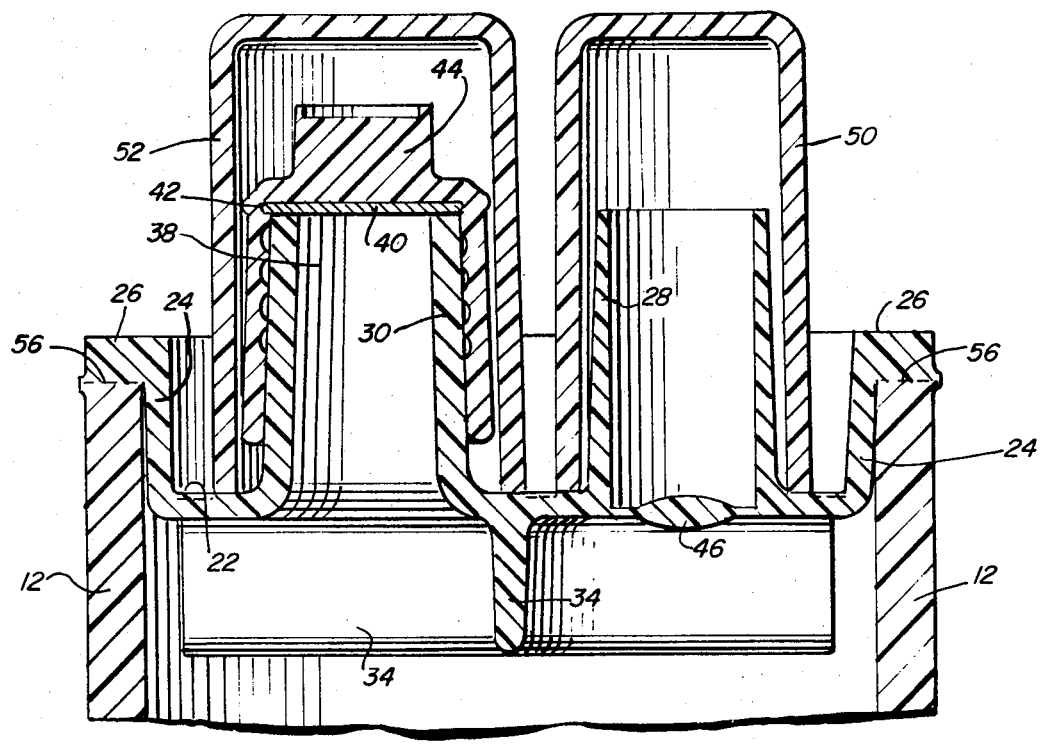
FIG. 2 is an enlarged cross-sectional elevation of a cap closure constructed in accordance with the principles of the present invention.

The injection site 44 is formed of a rubber material and is pressure-fit snugly with respect to port 30 as shown most clearly in FIG. 2. The polyolefin membrane 40, in combination with injection site 44, does not "core" when punctured.

As shown in FIG. 2, a membrane 46 is molded with the cap closure 20 and is located to lie in the plane of base portion 22. By recessing membrane 46 away from the walls of port 28, touch contamination is prevented when hospital personnel attach an administration set to administration port member 28. Membrane 46 remains attached to the closure when it is punctured.

The internal walls of the administration port member 28 have a slight internal taper to provide a tight fit with the external wall of the administration set spike before it penetrates the membrane. This aids in preventing leakage of the solution.

The top of peripheral rim 26 lies in a parallel plane with respect to base portion 22, and also bisects the height of the ports 28 and 30 which are substantially equal in height. Thus, the side wall 24 and peripheral flange 26 surround a portion of the ports to aid in preventing touch contamination during use.

Ports 28 and 30 are hermetically sealed by means of port protectors 50 and 52, respectively. These port protectors are described in copending U.S. patent application Ser. No. 777,748, filed Mar. 14, 1977, and assigned to the assignee of the present invention. These port protectors 50, 52 comprise a pair of molded thermoplastic caps which carry an external flange 54 to form a unitary structure. Port protectors 50 and 52 have a length to diameter ratio to provide a good mechanical advantage leverage, so that they can be easily popped off.

After the membrane 40 and injection site 44 are assembled to port 30, port protectors 50 and 52 are placed over ports 28 and 30, respectively, so that flange 54 will overlie island 32. A heated die is then brought down over the port protectors 50 and 52, making contact with flange 54. The die heats the flange 54 until it becomes molten and at the same time heats the top surface of island 32 to a molten stage. The two materials are fused together to form a frangible seal, which is a hermetic seal allowing either port protector to be removed without disturbing the integrity of the other.

The cap closure 20 is heat welded to the neck 12 of the container 10. To this end, the bottom surface of peripheral flange 26 is heated and the top surface 14 and ring 18 are heated until there is a film of molten plastic on the surfaces. The closure cap is then pressed together with the container neck, whereby the side wall 24 is inserted into the opening defined by ring 18 and the flange 26 is pressed onto ring 18 and top surface 14 to form a hermetic seal 56 (FIG. 2).

It can be seen that a cap assembly has been provided which is simple in construction and easy to manufacture. When an administration set is to be connected to container 10, protector cap 50 is broken off and the spike from the administration set is inserted into port 28 through membrane 46. To inject medicament, port protector 52 is broken off and a syringe needle is inserted through injection site 44 and membrane 40.

Although an illustrative embodiment of the invention has been shown and described, it is to be understood that various modications and substitutions may be made by those skilled in the art without departing from the novel spirit and scope of the present invention.

What is claimed is:

1. A method of producing a cap closure for a container comprising the steps of:
   molding a unitary member including a base portion and at least one port member on the base portion, said molding including forming plural ribs across said unitary member on a side opposite said port member;
   positioning membrane material over said port member;
   punching a membrane out of the membrane material with a heated die having a larger area dimension than the port member area;
   pressing the punched out membrane on to the top of the port member, whereby the membrane and port member portion adjacent thereto become molten and are fused together and a peripheral lip is formed around the membrane, said rib preventing deformation of said unitary member during said pressing step;
   providing a raised island portion surrounding the port member;
   positioning a port member protector over the port member with an external flange of the port member protector overlying the island; and
   bringing a heated die into thermal contact with the flange and the island to fuse the port member protector to the island and thereby hermetically seal the port member.

* * * * *